M. E. GRISWOLD.
VEHICLE AXLE.
APPLICATION FILED MAR. 14, 1917.

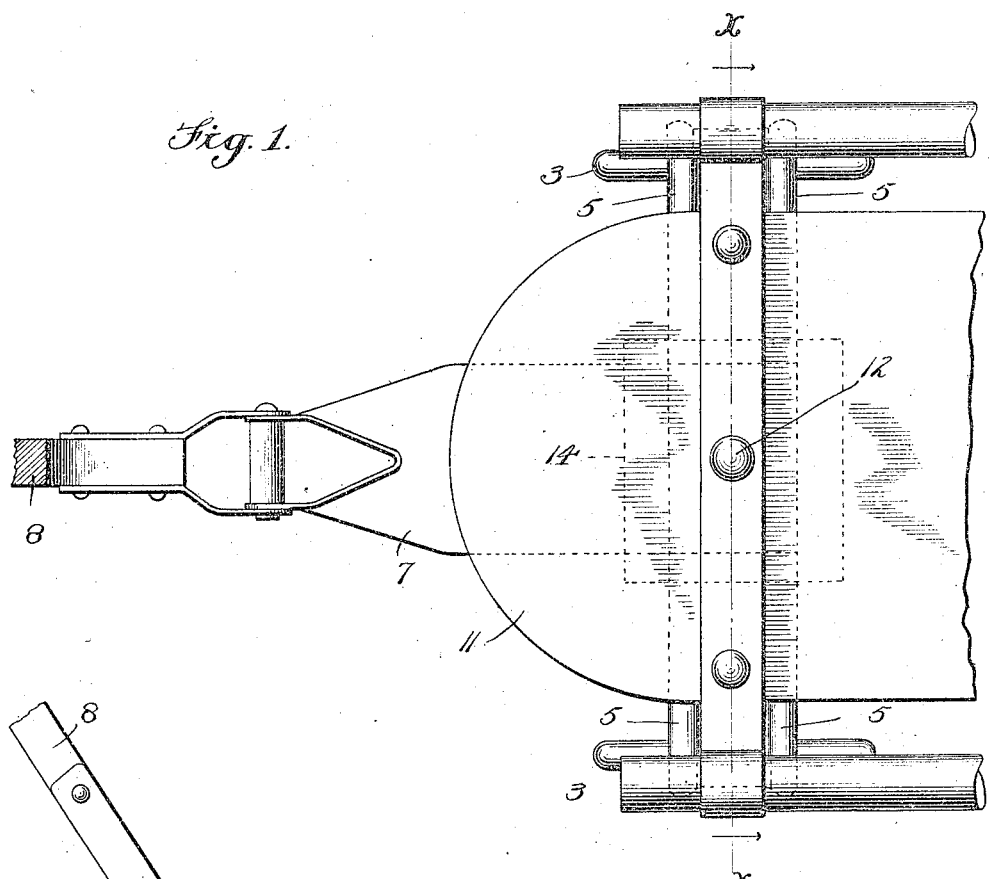
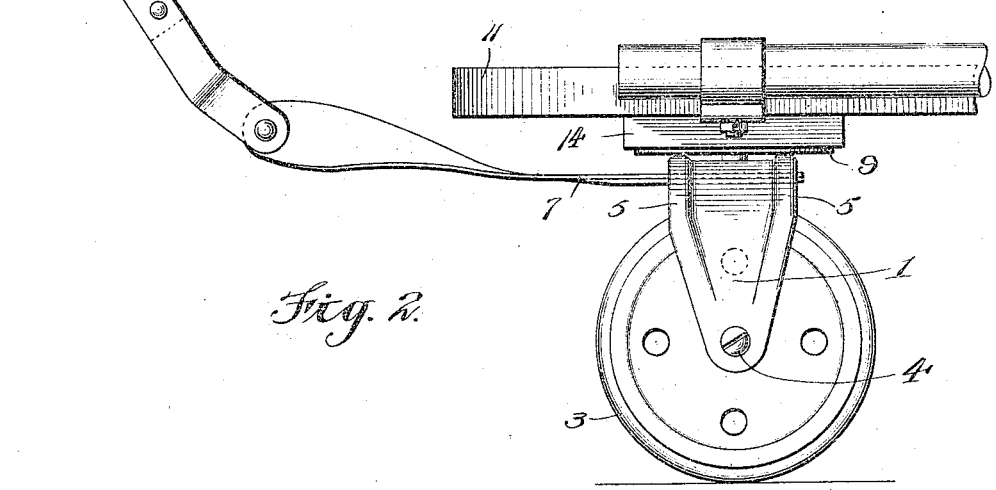

1,237,509.

Patented Aug. 21, 1917.
2 SHEETS—SHEET 2.

Inventor.
Marius E. Griswold
By Davis & Davis
Attys

UNITED STATES PATENT OFFICE.

MARIUS E. GRISWOLD, OF CHICAGO, ILLINOIS.

VEHICLE-AXLE.

1,237,509.

Specification of Letters Patent.

Patented Aug. 21, 1917.

Application filed March 14, 1917. Serial No. 154,908.

*To all whom it may concern:*

Be it known that I, MARIUS E. GRISWOLD, a citizen of the United States, and a resident of the city of Chicago, county of Cook, and State of Illinois, have invented certain new and useful Improvements in Vehicle-Axles, of which the following is a specification.

My invention relates to improvements in vehicle axles designed for use especially in connection with juvenile vehicles.

The object of my invention is the production of a vehicle axle which will be light in weight and simple and economical in construction, and which at the same time will possess great rigidity and firmness.

Other objects will appear hereinafter.

With these objects in view my invention consists in the combinations and arrangements of parts hereinafter described and claimed.

Figure 3:
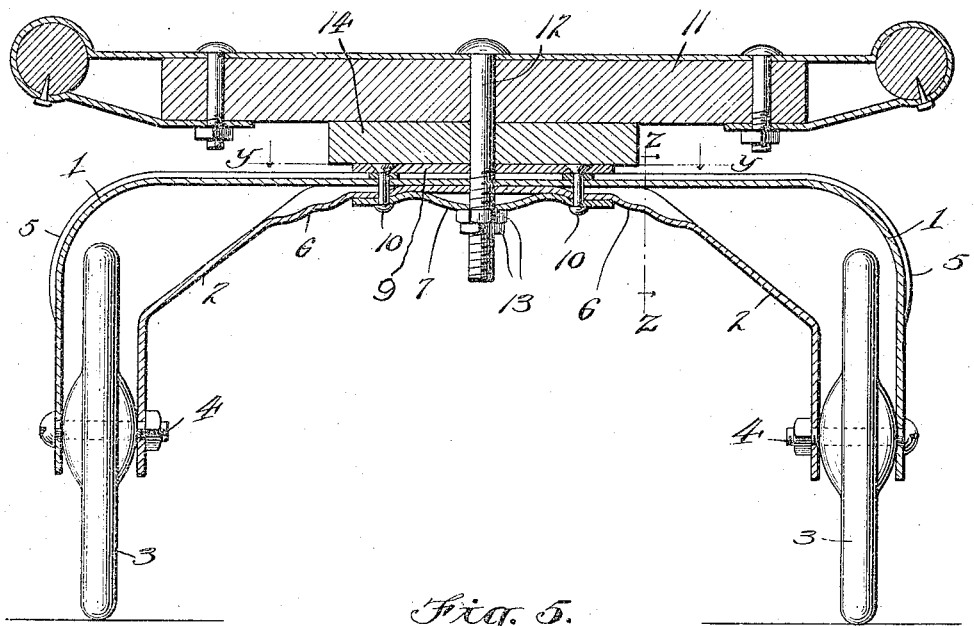
Figure 5:
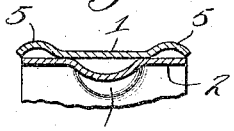
Figure 4:
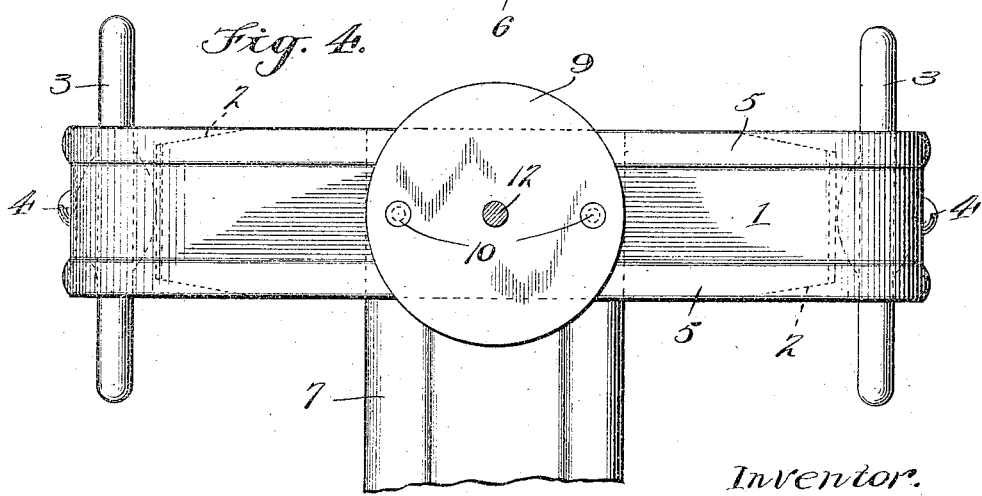

The invention will be best understood by reference to the accompanying drawings forming a part of this specifictaion, and in which, Figure 1 is a top plan view of the front end portion of a vehicle equipped with an axle embodying the invention, Fig. 2, a side elevation of the construction shown in Fig. 1, Fig. 3, a vertical transverse section taken on substantially line *x—x* of Fig. 1, Fig. 4, a horizontal section taken on line *y—y* of Fig. 3, and Fig. 5, a detail section taken on line *z—z* of Fig. 3.

The preferred form of construction as illustrated in the drawings comprises an axle consisting of two elongated sheet metal members 1 and 2 which are arranged in superimposed relation. Said members 1 and 2 are of substantially bowed formation, the respective ends of the former being bent downwardly in a comparatively wide curve as clearly shown in Fig. 3. The respective ends of the member 2 are bent downwardly to an inclined position from the center of said members, the extreme end portions of said member being disposed vertically. The parts 1 and 2 are of such dimensions and proportions that the vertically disposed portions thereof at corresponding ends are spaced apart for the reception of the vehicle wheels 3. Said end portions of said members 1 and 2 are also provided with alining openings for bolts 4 which constitute the spindles for said wheels.

The axle member 1 is formed at its longitudinal edges with longitudinally extending ribs 5 for reinforcement. The axle part 2 is formed at the juncture of the central portion thereof with the inclined portions of said member, with centrally positioned elongated reinforcing ribs 6. Said reinforcing ribs 5 and 6 are of course formed in the parts 1 and 2 in the stamping operation which results in the formation of said parts, the provision of said reinforcing ribs producing a structure which may be formed of comparatively light sheet metal but which, at the same time, will possess great strength and firmness.

Coöperating with the axle parts 1 and 2 is a forwardly projecting tongue 7 which is formed at its front end for connection with the rearward end of a handle 8. The rearward end portion of tongue 7 is positioned against the under side of axle part 2 as shown. Provided upon the upper side of the axle part 1 is a turn-plate 9. The parts 1, 2, 7 and 9 are rigidly connected by means of rivets 10 which pass through all of said parts as clearly shown in Fig. 3.

The axle is designed for use especially in connection with a vehicle comprising an elongated body or seat 11, the axle being connected with the vehicle by means of a bolt 12 which passes centrally through the axle and upwardly through the seat member 11 of the vehicle. Nuts 13 coöperate with the lower end of the bolt to lock the same in position. A block 14 is provided at the under side of the seat member 11 for engagement with the turn-plate 9 as shown.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A vehicle axle comprising two elongated superimposed members rigidly connected at their centers, the end portions of the upper one of said members being curved downwardly to substantially vertical position, the end portions of the lower one of said members being formed to extend downwardly at an angle from the center thereof and then vertically, the vertically extending portions of said lower member being spaced from the corresponding portions of said upper member to accommodate the vehicle wheels between said portions, substantially as described.

2. A vehicle axle comprising two elongated superimposed members rigidly connected at their centers, the end portions of the upper one of said members being curved downwardly to substantially vertical position, the end portions of the lower one of said members being formed to extend downwardly at an angle from the center thereof and then vertically, the vertically extending portions of said lower member being spaced from the corresponding portions of said upper member to accommodate the vehicle wheels between said portions, there being longitudinal reinforcing ribs formed in the central portion of said upper member, said ribs extending around the curved portions at the ends of said member, substantially as described.

3. A vehicle axle comprising two elongated superimposed members rigidly connected at their centers, the end portions of the upper one of said members being curved downwardly to substantially vertical position, the end portions of the lower one of said members being formed to extend downwardly at an angle from the center thereof and then vertically, the vertically extending portions of said lower member being spaced from the corresponding portions of said upper member to accommodate the vehicle wheels between said portions, there being longitudinal reinforcing ribs formed in said lower member at the juncture of the central portion thereof with said downwardly inclined portion, substantially as described.

4. An axle structure for juvenile wagons embodying a flat plate corrugated longitudinally and having its ends curved downwardly to form the outer members of the axle supports, said corrugations extending down along said downwardly-curved portions, inner axle-supporting members consisting of flat plates rigidly connected to the aforesaid plate and extending downwardly and outwardly from the center of the axle, and a flat tongue plate rigidly connected to the center of said axle structure.

In testimony whereof I have signed my name to this specification.

MARIUS E. GRISWOLD.

Copies of this patent may be obtained for five cents each, by addressing the "Commissioner of Patents, Washington, D. C."